INVENTORS.
HENRY M. ROWAN
THEODORE R. KENNEDY
BY Seidel & Gonda
ATTORNEYS.

INVENTORS.
HENRY M. ROWAN
THEODORE R. KENNEDY

BY Seidel & Gonda

ATTORNEYS.

— # United States Patent Office 3,335,354
Patented Aug. 8, 1967

3,335,354
STABILIZED CONTROLLED RECTIFIER CIRCUIT
HAVING AN INDUCTIVE LOAD
Henry M. Rowan, Moorestown, and Theodore R. Kennedy, Willingboro, N.J., assignors to Inductotherm Corporation, Rancocas, N.J., a corporation of New Jersey
Filed June 10, 1964, Ser. No. 374,036
5 Claims. (Cl. 321—8)

ABSTRACT OF THE DISCLOSURE

A circuit for restoring blocking conditions to silicon controlled rectifiers with inductive loads using a constant voltage bias connected in series with the direct current output of the silicon controlled rectifiers.

---

This invention relates to a controlled rectifier circuit. More particularly, it relates to a stabilized controlled rectifier circuit.

It has been determined that large volumes of molten metal can be stirred or agitated by using a system of inductors to induce controlled movement of a magnetic field within the molten metal. Power and current levels are high in apparatus used for stirring large volumes of molten metal. Thus, rectifying devices with high output ratings are required if the primary source of power is to be alternating current. At the power levels used, rectifying devices with the necessary ratings involve a considerable expense, even when operated at or near their maximum output rating.

It has been determined that because of the intermittent nature of the generated direct current pulses, it is feasible to overload the rectifying devices within operable limits. This permits the heating effect of the load current in the rectifying device to average out to operable limits.

However, even though such operating procedures work well, it has been found that operation of the stirring apparatus at high current values and at or above the maximum ratings of the rectifiers may result in a failure of the controlled rectifiers to recover their blocking properties at the prescribed time, thereby causing an electrical fault condition to develop within the apparatus. Although the stirring apparatus may be protected against the effects of such fault conditions, efficient operation of it requires that they be eliminated. It therefore is a general object of this invention to provide a stabilized controlled rectifier circuit which is not subject to electrical faults caused by the failure of the controlled rectifiers to recover their blocking properties at the proper time.

It is another object of this invention to provide a stabilizing means for controlled rectifier circuits.

It is still another object of this invention to provide an improved controlled rectifier circuit for magnetic stirring apparatus.

It is a further object of this invention to provide a novel means for stabilizing controlled rectifier devices.

It is still another object of this invention to provide an improved molten metal stirring apparatus.

Other objects will appear hereinafter.

For the purpose of illustrating the invention, there are shown in the drawings forms which are presently preferred; it being understood, however, that this invention is not limited to the precise arrangements and instrumentalities shown.

Figure 1:
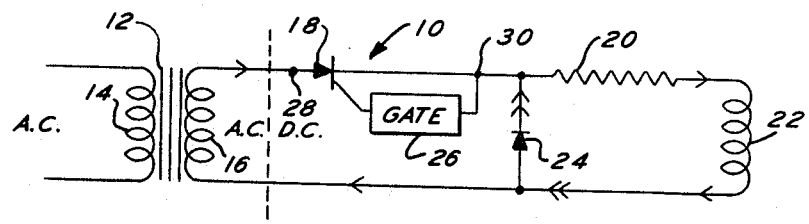
FIGURE 1 is a schematic diagram of a circuit for developing a magnetic pulse of energy.

In general the apparatus for producing the moving magnetic field includes a system of inductors that are sequentially energized by high energy direct current pulses to thus produce high energy magnetic pulses. In copending application Ser. No. 367,051 filed May 13, 1964, now abandoned, a method and apparatus for stirring large volumes of molten metal using a moving magnetic field is disclosed.

As disclosed in said copending application, the effective operation of such a stirring apparatus requires that a large proportion of the direct current pulse energy must be converted into magnetic energy in properly timed and spaced pulses. Further, the magnetic energy in each resultant magnetic pulse must be disposed of after each direct current pulse has effectively terminated. The apparatus chosen for accomplishing these objects in an efficient and convenient manner includes a commercial alternating source of power and controlled rectifying devices acting both as switches and rectifiers to establish the proper timing, duration and point of application of the direct current pulses. The apparatus also includes means to determine the program under which the controlled rectifying devices operate.

For purposes of this disclosure a rectifying device, whether controlled or not, is an electrically conducting device having a marked difference in its electrical conductivity relative to the polarity of the voltage applied to its terminal. Rectifying devices referred to herein do not necessarily have infinite or zero conductivity. Rather, depending on the polarity of the voltage across the rectifying device, there may be either a small voltage drop or a small leakage current.

Certain rectifying devices in their passive state have the property of being substantially non-conducting for both forward and reverse polarities. Upon the application of an electrical signal voltage to the proper terminals of such devices, they will conduct in the forward direction but maintain the same low conductivity or blocking characteristics in a reverse direction. Such devices are referred to as controlled rectifiers. By properly using controlled rectifiers, large amounts of rectified current can be controlled with relatively low power.

Some of these controlled rectifying devices have the property that it is unnecessary to maintain the control signal voltage once current has begun to flow through said device in the forward direction. Thus, if alternating current is applied to such a device, the signal voltage need be applied only during the first few electrical degrees at the start of the forward potential. Even though the signal voltage is removed, the forward conducting state will continue for the remainder of the one-half cycle of alternating current potential.

The nature of these controlled rectifying devices is generally that full blocking is restored within a very short time after the forward current has fallen to zero. Recovery time for full blocking is usually of the order of a few micro-seconds.

In certain types of controlled rectifying devices there is no practical way of restoring blocking in the forward direction once the current has begun to flow, except when the current goes substantially to zero. Controlled rectifying devices of this type are known as thyratrons, ignitrons and silicon controlled rectifiers.

In rectification circuits using the controlled rectifiers of the type mentioned above, conditions can be such that a forward current may persist long enough to prevent restoration of full blocking characteristics. In such a case an electrical fault condition will develop in the controlled rectifier circuit.

This can be better explained by referring now to the drawings, wherein like numerals indicate like elements. There is shown in FIGURE 1 a circuit for developing a magnetic pulse of energy designated generally as 10.

Circuit 10 comprises a transformer 12, consisting of a primary winding 14 and a secondary winding 16. The primary winding 14 is connected to a source of alternating current. The secondary winding 16 is connected in series circuit relation with a controlled rectifier 18, a resistance 20, and an inductance 22. The rectifying device 24 is connected in parallel with the resistance 20 and inductance 22. Control signals for the controlled rectifier are provided by a circuit designed for this purpose. The control circuits herein is indicated in the drawings by a block diagram representing a gate circuit 26.

Controlled rectifier 18 may be a Silicon Controlled Rectifier (SCR). Gate circuit 26 may be one of the type described in the SCR Manual, Second Edition, 1961, by The General Electric Company, Auburn, N.Y. It may also be of the type illustrated in the copending application Ser. No. 367,051, now abandoned.

Controlled rectifier 18 functions in the nature of a switch which is periodically opened and closed. The rate at which the switch is opened and closed is determined by the gate circuit 26. The switch is closed when gate circuit 26 supplies a signal to the SCR 18. It then conducts in the forward direction. In practice the SCR is turned on at the proper phase angle of the alternating current source by the gate circuit 26. As indicated above, in normal operation the SCR 18 remains in the forward conducting state until the alternating current potential across the terminals 28 and 30 falls to zero in the forward direction just prior to the beginning of the reverse voltage.

The flow of current in the direction shown in FIGURE 1 when the SCR 18 is in the forward conducting state as indicated by the single arrowhead. If a gate signal is applied to the SCR 18 after it has been restored to its forward blocking position, due to the voltage reversal and cessation of the forward current, the circuit comprising resistor 20, inductor 22 and rectifier 24 is cut off from the alternating current power source. This is the same as if a switch had been opened at the point in the circuit where SCR 18 is located. The double arrowhead 18 indicates the path of the current due to the stored magnetic energy in the inductor 22 when the potential from the alternating current source is cut off by SCR 18.

The current indicated by the single arrowhead is an increasing current pulse. The current indicated by the double arrowhead is a decreasing current pulse. These current pulses could be described by the known equations for transient current pulses. Thus, the inductor charging current pulse tends to rise asymptotically, and the decay current tends to fall asymptotically to zero. When the time duration periods for the charge and decay current cover intervals corresponding to several cycles of source frequency, there is a possibility that during the decay period a direct current voltage drop may exist across rectifier 24. This voltage drop is caused by the fact that rectifier 24 presents some resistance to the flow of current through it in the forward direction. This voltage drop may cause a small forward current to flow through the supply transformer secondary winding 16 and SCR 18. If this small forward current persists longer than the reverse one-half cycle of supply voltage, then SCR 18 will be maintained in the forward conducting state at the beginning of the next forward one-half cycles, even if gate 26 is inoperative.

As soon as the current through SCR 18 begins to fall, the current through rectifier 24 immediately begins to rise. Thus, the so-called "free-wheeling" action of rectifier 24 causes it to substantially take over the inductive current from inductor 22 during the "off" period of SCR 18.

Technical data on SCR devices indicate that an SCR that can carry several hundred amperes in the forward direction needs only forward currents of 20–30 milliamps to remain in a conducting state. Thus, it is important that if highly inductive circuits are to be energized and de-energized in a consistant manner using controlled rectifiers, means must be provided to lower residual forward holding currents to a point where the rectifier device will recover blocking in the forward direction.

For one example, decay currents during the reverse one-half of the alternating current power source is 2000 amperes for a particular inductor 22. This current may be divided between four parallel silicon diodes like rectifier 24. At 500 amperes per diode the forward diode voltage drop is about 1 volt. A comparable SCR at 1000 milliamps has a forward drop of about 0.7 volt. Thus, a small forward voltage, which may even be less than the diode voltage drop can keep an SCR in the conducting state. Accordingly, the effect of an inductive load, which produces a high decay current, can keep an SCR in the conducting state through the reverse one-half cycle of alternating current supply voltage, to thereby override the gate control of the SCR.

Other effects on the SCR have been noted. In some cases the SCR may lose reverse blocking characteristics and short out the system during the reverse cycle. Other types of rectifying devices may also fault by arc-back if conductance during the blocking one-half cycle overrides the gate control.

Figure 2:
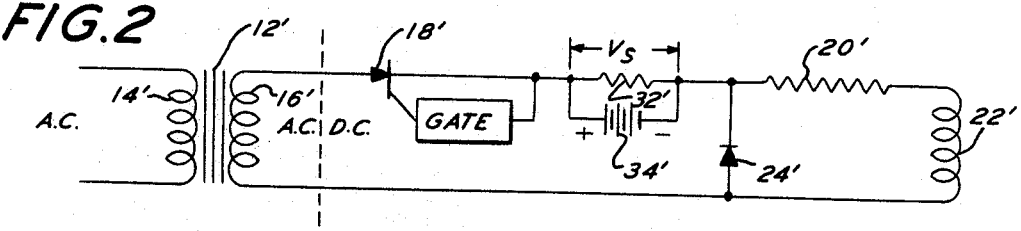
FIGURE 2 is a schematic diagram of a stabilized circuit for developing a magnetic pulse of energy.

It has been determined that by interposing a small counter electromotive force in the output circuit of an SCR, adequate gate control is retained when applying direct current pulses to a highly inductive load. This is shown in FIGURE 2 by a voltage $V_S$ across a low resistance 32. In FIGURE 2, elements like those in FIGURE 1 are indicated by prime numerals. The voltage $V_S$ is developed by a direct current source 34. The voltage $V_S$ is chosen such that threshold or minimum forward conductance voltage of the SCR 18' plus voltage $V_S$ is substantially equal to or greater than the maximum forward voltage drop across rectifier 24'. Because of the wide variation of dynamic impedance of rectifying devices, the actual value of $V_S$ relative to SCR 18' and rectifier 24' or their counterparts is a matter of operating adjustment. A value of 2–5 volts for $V_S$ has been found satisfactory in a circuit employing SCR's and silicon diodes with pulse current peaks of 2000 amperes.

The value of resistance 32 may be in the milliohm range for peak currents of 2000 amperes. In a general way, the value of resistance 32 is chosen so that the loss indicated by the quantity $(V_S^2/R_S)$ (where $R_S$ is the value of resistance 32 in ohms) is substantially equal to the quantity $(I_{RMS}^2 R_S)$ (where $I_{RMS}$ is the root-meansquare value of the pulse current through the resistance-inductance circuit comprising resistor 20 and inductor 22).

Figure 3:
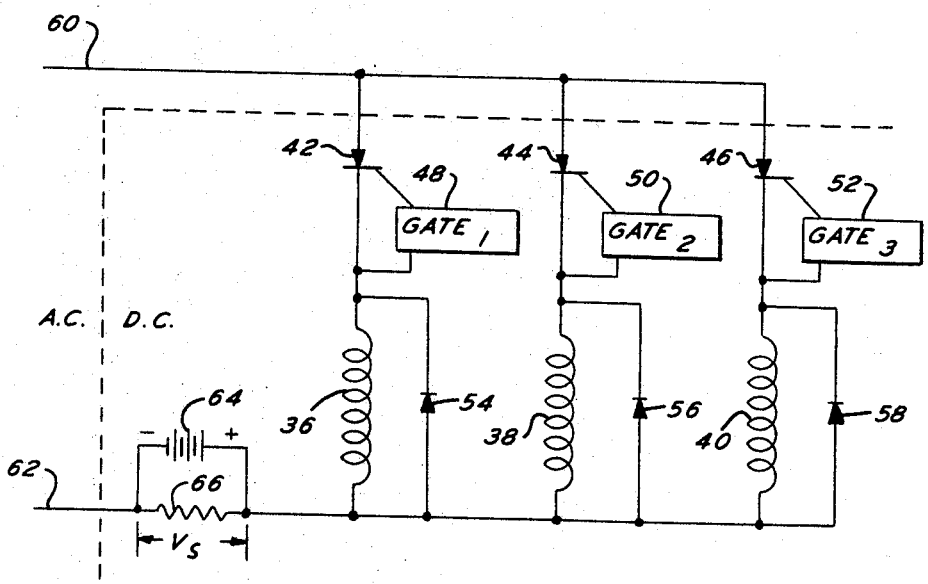
FIGURE 3 is a schematic diagram of a stabilized circuit for developing a series of sequential pulses of magnetic energy.

In FIGURE 3, there is shown a circuit having three separate inductive loads 36, 38 and 40 connected in circuit relation with three SCR's 42, 44 and 46 to energize the inductors in any specified order. The order and rate in which the inductors 36–40 are energized is determined by the control gates 48, 50 and 52. A circuit such as is shown in FIGURE 3 may be used to stir or agitate molten metal. If so used, the inductors 36–40 could be magnetically coupled to the molten metal in a spatial relationship so as to produce overlapping magnetic fields. By properly timing energization of inductors 36–40 a moving magnetic field is produced in the molten metal. This is explained in more detail in copending application Ser. No. 367,051, now abandoned.

Rectifiers 54, 56 and 58 are connected in parallel with inductors 36–40, and have the same "free-wheeling" function as described with regard to the circuit shown in FIGURES 1 and 2. The circuit is energized by means of an alternating current source applied to lines 60 and 62. A stabilizing means for providing a stabilizing voltage $V_S$ is connected in line 62. As shown, the stabilizing means comprises a direct current source 64 and a resistance 66. The single stabilizing means providing voltage $V_S$ functions in the same manner as described with regard to the circuit shown in FIGURE 2. A single stabilizing means is equally effective for a multiple number of controlled rectifiers such as SCR's 42–46 providing there is a common direct current return from multiple inductive loads 36–40 and said loads have substantially similar energy requirements.

Figure 4:
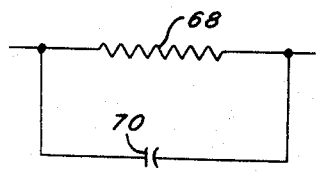
FIGURES 4 and 5 are partial schematic diagrams illustrating alternative forms of means for stabilizing the circuit shown in FIGURES 2 and 3.

Although a resistor in direct current source has been shown in FIGURES 1, 2 and 3 for providing potential $V_S$, other means may be used. In FIGURE 4 there is shown a resistor 68 shunted by a capacitor 70. Capacitor 70 may be a low voltage high capacity electrolytic unit. Upon passage of the forward pulse current through resistor 68, the capacitor 70 is charged to a potential high enough to assist in restoring the controlled rectifiers to their full blocking condition as at the beginning of the succeeding one-half cycle of alternating current potential across the controlled rectifier.

Figure 5:
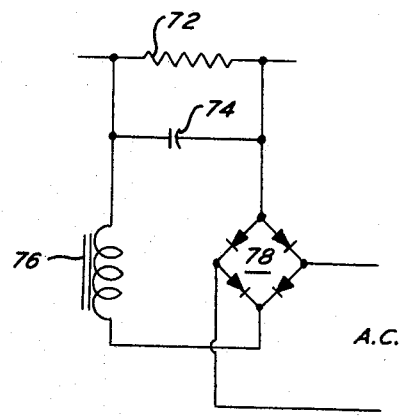

In FIGURE 5 there is shown a single phase bridge rectifier with a simple current smoothing or filter circuit to provide voltage $V_S$. As shown, the circuit comprises a resistor 72, a capacitor 74 connected across the resistor, and inductor 76 connected in series with the resistor 72 and capacitor 74. A bridge rectifier 78 for rectifying current from an alternating current source, applies voltage of the correct polarity to resistor 72.

Figure 6:
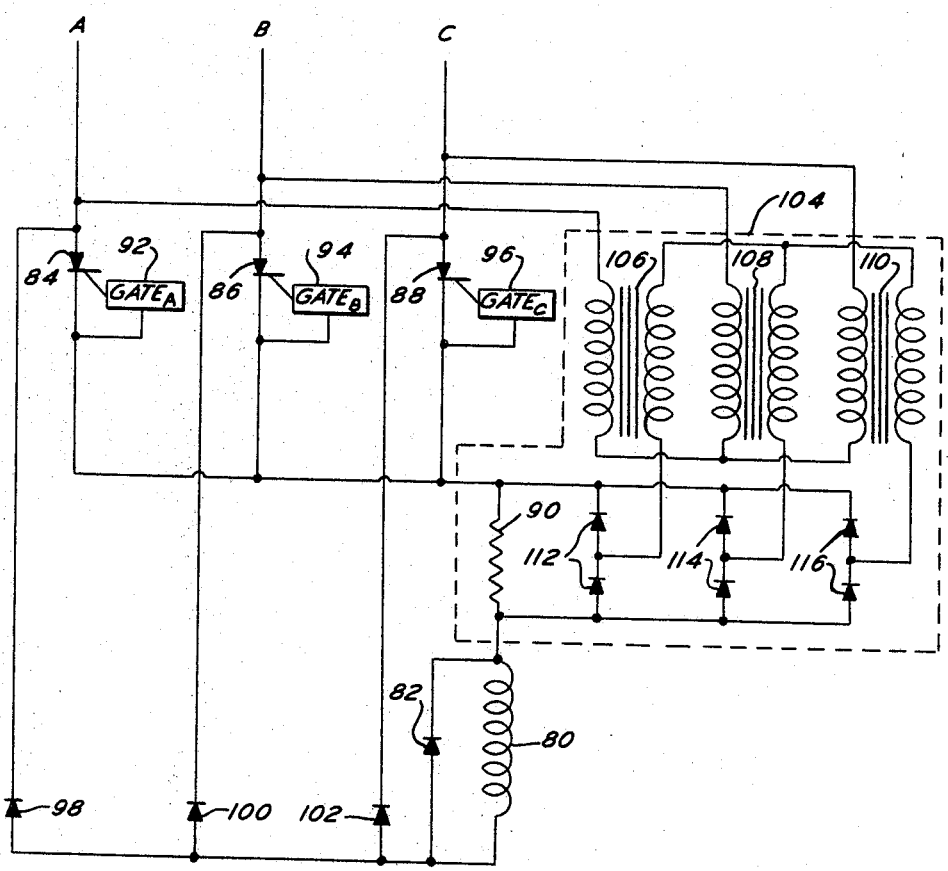
FIGURE 6 is a schematic diagram of the stabilized circuit for generating a magnetic pulse of energy using three phase alternating current.

The circuit shown in FIGURE 6 illustrates a three-phase circuit using SCR's and silicon diodes. This circuit is capable of applying controlled direct current pulses to a highly inductive device, the pulse rate and duration being specifically determined by a program of signals to the SCR gate circuit. As shown the circuit includes an inductor 80 connected in parallel with a rectifier 82. An alternating current three-phase source ABC supplies power to energize inductor 80 through SCR's 84, 86 and 88 and resistor 90 to which each of the SCR's 84, 88 are commonly connected. Control gates 92–96 are connected to an SCR in each phase. Blocking rectifiers 98–102 are provided in the return line of each phase. Stabilizing means, which has been termed a "snubber," is shown within the dotted area. The snubber comprises suitable transformers 106, 108 and 110 connected respectively to one-phase of the three-phase source. The secondary of these transformers is connected between one of three pairs of rectifiers 112, 114 and 116. Rectifiers 112, 116 form a three-phase bridge rectifier, developing a direct current voltage across resistor 90. In this way the circuit shown in FIGURE 6 is stabilized and SCR's 84–86 recover full blocking during the reverse half cycle.

The three-phase rectifier bridge shown in FIGURE 6 can be replaced by other means for developing stabilizing voltage $V_S$. For example, stabilizing means shown in FIGURES 4 and 5 could be used. Further, it should be noted that a multi-phase power source could be arranged to energize multiple inductive loads. In this case, if a common direct current return is provided then a single stabilized means may be inserted into a portion of the common line with a polarity selected to stabilize the controlled rectifiers.

Where large currents are involved, the stabilizing resistors (e.g. resistor 32 or 90) may be made in any convenient way to dissipate the $I^2 R$ losses. A water cooled tube of stainless steel or other high resistance alloy is well adapted for high current application.

It will be understood, that although in some of the embodiments shown herein controlled rectifier has been shown as a so-called half-wave rectifier, in practice, where large amounts of power are involved, full wave rectification of either single or polyphase sources may be used.

The present invention may be embodied in other specific forms without departing from the spirit or essential attributes thereof and, accordingly, reference should be made to the appended claims, rather than to the foregoing specification as indicating the scope of the invention.

We claim:

1. Apparatus comprising at least one inductive load, rectifier means connected in parallel with said load, said rectifier means having properties such that it is non-conductive of positive direct current pulses being applied to it and the load, controllable rectifying means coupled to one terminal of said load, said controllable rectifying means being substantially non-conductive to both forward and reverse polarities in its passive state, gate means coupled to said controllable rectifying means for intermittently biasing said controllable rectifier means into a forward conducting state, constant voltage bias means coupled in series with the output circuit of said controllable rectifying means, said voltage bias means being of such polarity and value that the voltage generated by the decay current from said inductive load is not sufficient to maintain said controllable rectifier in a forward conducting state after a positive current pulse from an alternating current source has terminated.

2. Apparatus in accordance with claim 1 wherein said voltage bias means comprises a parallel resistor and capacitor connected between said controllable rectifying means and said one terminal of said inductive load.

3. Apparatus in accordance with claim 1 wherein said voltage bias means comprises a resistor connected in series between said controllable rectifying means and said one terminal of said inductive load, and a rectifier means and a current smoothing network for applying a direct current voltage across said resistor.

4. Apparatus comprising an inductive load, a rectifier connected in parallel with said inductive load, said rectifier having properties such that it is substantially non-conductive when a forward direct current pulse of increasing value is applied to said load, voltage bias resistor means coupled to one terminal of said load, three-phase alternating current controllable rectifying means and said load coupled to said voltage bias means, gate means connected to said controllable rectifying means for intermittently biasing said controllable rectifying means into a forward conducting state, a three-phase rectifying bridge connected across said resistor means, and transformer means coupled to said rectifying bridge.

5. Apparatus comprising a plurality of inductive loads, rectifier means connected in parallel with each one of said inductive loads, said rectifier means being connected such that they block forward direct current pulses being applied to them, controllable rectifying means coupled to one terminal of each of said loads, said controllable rectifier means being substantially non-conductive for both forward and reverse polarities in their passive state, gate means connected to each of said controllable rectifying means for intermittently biasing said controllable rectifier means into a forward conducting state, said inductive loads and their respective controllable rectifiers being connected in parallel, voltage bias means coupled to each of said controllable rectifier means for applying a voltage bias of such polarity and value that voltage generated by the decay current from said inductive load is not sufficient to maintain said controllable rectifier in a forward conducting state after forward power from an alternating current power source has terminated and a gate signal from said gate biasing means has been removed.

References Cited

UNITED STATES PATENTS

| 3,205,411 | 9/1965 | Culbertson | 307—88.5 |
| 3,268,793 | 8/1966 | King et al. | 307—88.5 |

FOREIGN PATENTS

| 1,135,043 | 8/1962 | Germany. |

JOHN F. COUCH, *Primary Examiner.*

W. H. MEHA, *Assistant Examiner.*